United States Patent [19]

Arriulou et al.

[11] Patent Number: 5,505,050
[45] Date of Patent: Apr. 9, 1996

[54] PROCESS AND INSTALLATION FOR THE DISTILLATION OF AIR

[75] Inventors: Pascal Arriulou, Saint Maurice; Frédéric Bernard, Paris; Jean-Yves Lehman, Maisons Alfort, all of France

[73] Assignee: L'Air Liquide, Societe Anonyme Pour l'Etude et l'Exploitation des Procedes Georges Claude, Paris Cedex, France

[21] Appl. No.: 338,196

[22] Filed: Nov. 9, 1994

[30] Foreign Application Priority Data

Nov. 19, 1993 [FR] France .................................. 93 13836

[51] Int. Cl.⁶ .......................................................... F25J 3/00
[52] U.S. Cl. .......................................................... 62/18; 62/40
[58] Field of Search ........................................... 62/18, 40

[56] References Cited

U.S. PATENT DOCUMENTS 3,643,451  2/1972  Foucar ........................................... 62/18
4,717,406  1/1988  Giacobbe ..................................... 62/18
5,187,131  2/1993  Tiggelbeck et al. ........................ 62/18

FOREIGN PATENT DOCUMENTS 2484276  12/1981  France .
1167566  7/1989   Japan .
4003877  1/1992   Japan .
5172459  7/1993   Japan .

Primary Examiner—Ronald C. Capossela
Attorney, Agent, or Firm—Young & Thompson

[57] ABSTRACT

To regenerate the adsorbent which serves to purify compressed air from water and carbon dioxide, there is used residual gas from an air distillation apparatus (10), heated to a substantially constant moderate regeneration temperature between the temperature of the air entering the mass of adsorbent and a temperature which is at most about 50° C. higher, preferably about 10° to 20° C. higher, than this entering air temperature. This gas is then sent to a water refrigeration tower (16) for cooling the compressed air.

11 Claims, 1 Drawing Sheet

PROCESS AND INSTALLATION FOR THE DISTILLATION OF AIR

FIELD OF THE INVENTION

The present invention relates to a process for air distillation of the type in which air is compressed; the compressed air is cooled by heat exchange with cooling water previously refrigerated by heat exchange with residual gas from the air distillation apparatus; the compressed and cooled air is purified of water and carbon dioxide, by adsorption in a mass of adsorbent; and he mass or adsorbent is regenerated by means of residual gas from the air distillation apparatus.

BACKGROUND OF THE INVENTION

The installations for the production of large quantities of oxygen and/or nitrogen by air distillation often comprise a refrigeration tower which serves to refrigerate the water for cooling the compressed air, so as to lower the temperature of the air upon its entry into the adsorbent chambers. This tower is supplied with residual gas (impure nitrogen or air enriched in nitrogen) from the distillation apparatus.

In the usual technique, only a portion of the residual gas supplies the refrigeration tower, and the rest is used only for the regeneration of the adsorbent. Thus, the usual regeneration cycle alternates a heating phase and a cooing phase. The residual gas then leaves the chamber saturated in water, with a very variable temperature from about −5° C. to +40° C. This residual fraction can therefore not be used effectively to refrigerate the water.

This technique has the drawback of greatly limiting the flow rate of residual gas available to refrigerate the water, and hence of limiting the lowering of the temperature of this water. It is thus necessary to install in the conduit of water from the refrigeration tower a refrigeration group having a high refrigeration power.

SUMMARY OF THE INVENTION

The invention has for its object improving the performances of the refrigeration tower. To this end, the invention has for its object a process for the distillation of air of the type recited above, characterized in that the regeneration of the adsorbent is effected by means of residual gas brought to a substantially constant moderate regeneration temperature, particularly comprised between the temperature of air entering the mass of adsorbent and a temperature higher at most by about 50° C., preferably about 10° to 20° C., than this entering air temperature, and there is utilized at least a portion, and preferably all, of the gas having effected this regeneration to refrigerate the water for cooling the compressed air.

This process can comprise one or several of the following characteristics:

- the regeneration of the adsorbent is effected in a single stage by means of residual gas at a substantially constant temperature, the adsorbent being returned to the adsorption phase immediately after this single stage;
- the residual regeneration gas is brought to said moderate temperature by heat transfer from the compressed air that has not yet been subjected to said cooling;
- said heat transfer is effected indirectly by means of a transfer fluid taking heat from the compressed air that has not yet been subjected to said cooling;
- the residual regeneration gas is brought to said moderate temperature by heat exchange with a fraction of the compressed air which has been moreover supercharged;
- there is moreover used the rest of the residual gas from the distillation apparatus to refrigerate the cooling water for the compressed air.

The invention also has for its object an air distillation installation adapted to practice such a process. This installation, of the type comprising an air distillation apparatus; a principal air compressor; a first heat exchanger which places the compressed air in heat exchange relation with the cooling water: a water refrigeration tower which places the cooling water, upstream of said heat exchanger, with the residual gas of the distillation apparatus; an apparatus for purifying air from water and carbon dioxide which comprises at least two adsorbent chambers and means to place alternately these chambers in adsorption phase and regeneration phase as to the adsorbent: means to supply the chamber that is in regeneration phase with residual gas from the distillation apparatus; and means for heating the residual regeneration gas, is characterized in that the means for heating the residual regeneration gas are adapted to bring this gas to a substantially constant moderate regeneration temperature, particularly comprised between the temperature of the air entering the adsorption mass and a temperature higher by at most about 50° C., preferably from about 10° to 20° C., than this entering air temperature, and in that the installation comprises means to send to the refrigeration tower the residual regeneration gas from the adsorption chamber that is in regeneration phase.

BRIEF DESCRIPTION OF THE DRAWINGS

Examples of practice of the invention will now be described with respect to the accompanying drawing, in which.

DESCRIPTION OF THE PREFERRED EMBODIMENTS

Figure 1:
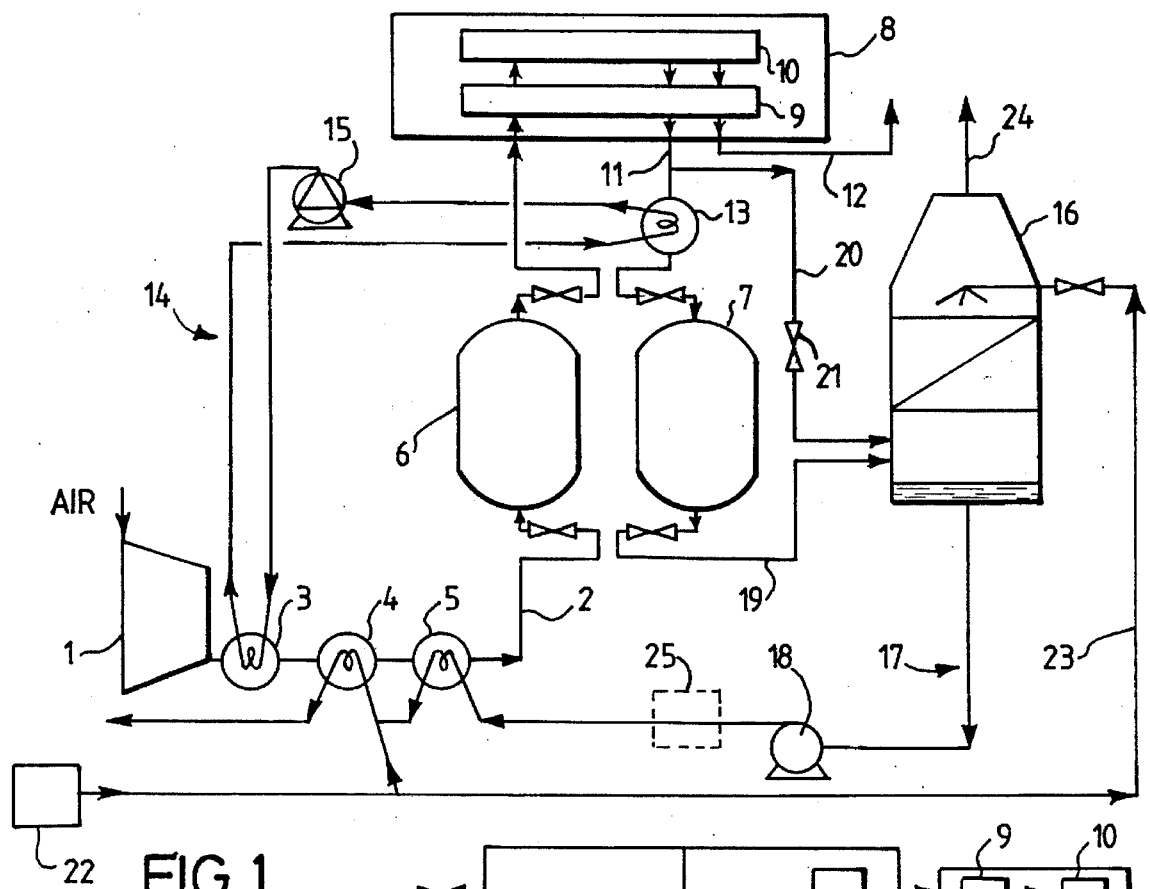
FIG. 1 shows schematically an installation for the distillation of air according to the invention.

The installation shown in FIG. 1 comprises a principal air compressor 1 in the discharge conduit 2 of which are mounted successively three indirect heat exchangers 3 to 5 in series; two adsorption chambers 6, 7 which operate alternately; a cold box 8 containing a principal heat exchange line 9 and an apparatus 10 for the distillation of air, which can be a double distillation column producing particularly oxygen, or else a simple distillation column producing nitrogen; a conduit 11 for residual gas from the distillation apparatus, leaving the warm end of the heat exchange line 9 and emptying into one of the chambers 6 and 7 which is in regeneration phase (the chamber 7 in the illustrated example); a production conduit 12 leaving the warm end of the heat exchange line; a heat exchanger 13 mounted in the conduit 11 between the cold box 11 and the chambers 6, 7; a heating water circuit 14, with a circulation pump 15, between the exchangers 3 and 13; a water/residual gas refrigeration tower 16, for example of the packed type; and a cooling water circuit 17 with a circulating pump 18. To simplify the drawing, there has been shown only schematically the means permitting switching the adsorption chambers 6 and 7 between their alternate adsorption and regeneration phases, and there is shown the exchanger 13 associated with only one chamber 7 which is in regeneration phase.

There will now be described the operation of the installation, with a numerical example of use.

Atmospheric air to be treated is compressed in 1 to a medium pressure of six bars absolute, then cooled in three stages in 3, 4, 5, from a temperature of the order of 100° C. to a temperature of 13.5° C. This air is introduced into the chamber 6 in adsorption phase, from which it leaves at 18.5° C. because of the heat of adsorption of water and $CO_2$. The purified air then enters the cold box 8, where it is cooled and then distilled in conventional manner.

The residual gas from the apparatus 10 leaves the cold box via the conduit 11 and is divided into two streams.

The first stream is reheated to +30° C. in 13, then enters the other chamber 7, whose regeneration it effects. This gas leaves the chamber 7 at +6° C., then is sent, via conduit 19, to the base of the refrigeration tower 16.

The rest of the residual gas is directly sent, via a conduit 20 provided with a valve 21, to the base of the tower 16.

The pump 15 causes the water to circulate, in a closed circuit, from the exchanger 3, from which it removes the heat of the compressed air from the compressor 1, to the exchanger 13, in which the water gives up its heat to the residual gas to bring it to the recited moderate temperature of +30° C.

Cooling water at +20° C., from a suitable source 22, for example from a source of ground water, supplies directly the exchanger 4, which brings the compressed air to +25° C. To continue the cooling of this air, water from the same source 22 is sent via a conduit 23 to the head of the tower 16, in which it is cooled in downward flow by contact with the residual gas, which is introduced to the base of the tower via the conduits 19 and 20 and is removed from the top of the tower via a conduit 24.

In this way, the water leaves the base of the tower 16 at +8.5° C., and it is sent by the pump 18 to the exchanger 5.

This permits reducing the temperature of the compressed air, before its entry into the chamber 6, to +13.5° C., and the purified air leaves the chamber 6 at +18.5° C. to enter the cold box 8. If a lower temperature of the air to be purified is desired, there can, as shown in dashed lines, be mounted a cooling group 25 of low power in the supply conduit of water for the exchanger 5.

When the chamber 6 is nearly saturated, the chambers 6 and 7 are switched. The exiting air, after purification, from the chamber 7 is then initially at +30° C. instead of 18.5° C. in the established regime. A wave of heat therefore enters the cold box but this wave of heat is sufficiently weak to be easily absorbed by the thermal inertia of the heat exchange line 9.

Thanks to the technique described above, the residual gas serving for the regeneration of the adsorbent leaves the chamber 6 or 7 at a temperature that is nearly constant and sufficiently low (+6° C. in the example given) to be used as refrigerant in the tower 6. All the residual gas from the distillation apparatus can therefore serve for the refrigeration of the cooling water of the compressor, such that this water can be cooled to a low temperature. The immediate advantage is the reduction of the size of the refrigeration group located generally downstream of the tower in the water circuit, or even its elimination.

Moreover, because of the relatively low regeneration temperature, the necessary heat can be recovered at the outlet of the compressor, the temperature of the air after compression being about 100° C.

As a modification, there could moreover be envisaged an indirect heat exchange between the air leaving the compressor and the residual gas leaving the cold box, without use of the intermediate water circuit 14.

Figure 2:
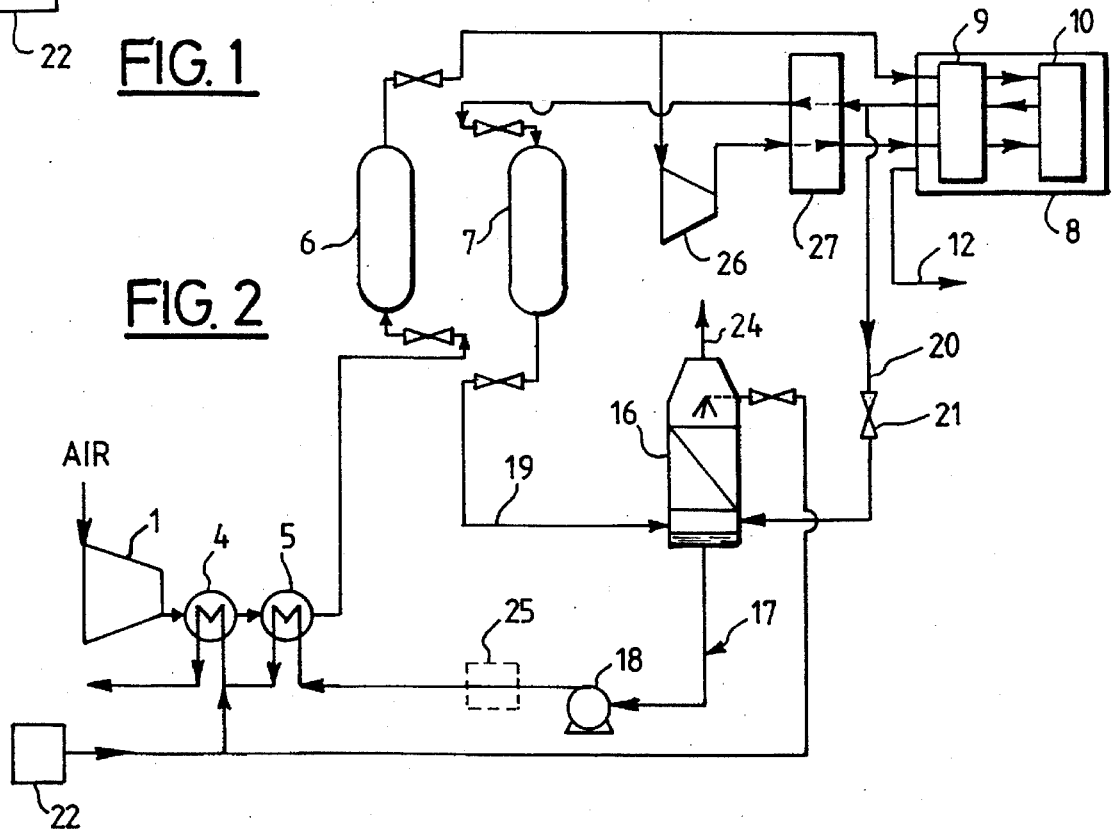
FIG. 2 shows schematically a modification.

As another modification, shown in FIG. 2, in the case in which at least one portion of the purified air is supercharged in 26 before its entry into the heat exchange line 9, the heating of the residual regeneration gas can take place in an auxiliary heat exchanger 29, by heat exchange between this gas and the supercharged fraction of air. In this case, the water circuit 14 can be eliminated, as shown in FIG. 2.

The invention is also applicable to installations comprising an air distillation apparatus which produce a residual gas under pressure. In this case, the water/nitrogen refrigeration tower can be closed and can operate under pressure.

We claim:

1. In a process for the distillation of air, comprising: compressing air; cooling the compressed air by heat exchange with cooling water preliminarily refrigerated by heat exchange with residual gas from an air distillation apparatus; purifying the compressed and cooled air of water and carbon dioxide by adsorption in an adsorbent mass; and regenerating the adsorbent mass by contact with residual gas from the air distillation apparatus; the improvement comprising effecting the regeneration of the adsorbent mass by said residual gas at a substantially constant moderate regeneration temperature, comprised between the temperature of the air entering the adsorbent mass and a temperature which is higher by at most about 50° C. than the entering air temperature, and utilizing at least a portion of the gas having effected said regeneration to refrigerate the cooling water for the compressed air.

2. A process according to claim 1, wherein the regeneration of the adsorbent mass is effected in a single stage by contact with residual gas at a substantially constant regeneration temperature and the adsorbent mass is returned to an adsorption phase immediately after said single stage.

3. A process according to claim 1, wherein the residual regeneration gas is brought to said moderate regeneration temperature by heat transfer from compressed air which has not yet been subjected to cooling.

4. A process according to claim 3, wherein said heat transfer is effected indirectly by means of a transfer of fluid taking heat from the compressed air that has not yet been subjected to said cooling.

5. A process according to claim 1, further comprising bringing the residual regeneration gas to said moderate regeneration temperature by heat exchange with a fraction of the compressed air having been subjected to supercharging.

6. A process according to claim 1, further comprising using a portion of the residual gas from the distillation apparatus that has not taken part in regenerating the adsorbent mass to cool the cooling water for the compressed air.

7. A process according to claim 1, wherein said regeneration temperature is higher by about 10° to 20° C. than the entering air temperature.

8. An air distillation installation comprising: an air distillation apparatus; an air compressor having an outlet for compressed air; a first heat exchanger which places the compressed air in heat exchange relation with cooling water; a water refrigeration tower which places the cooling water, upstream of said first heat exchanger, in heat exchange relation with residual gas from the distillation apparatus; an apparatus positioned downstream of said first heat exchanger for purifying compressed air from water and carbon dioxide, said purifying apparatus including at least two adsorbent-containing adsorption chambers and means for placing said chambers alternately in adsorption phase and in regeneration phase of the adsorbent; conduit means for supplying the chamber that is in regeneration phase with residual gas from the distillation apparatus; means for heating the residual gas supplied to said chamber in regeneration phase; said means for heating adapted to bring said residual gas supplied to said chamber in regeneration phase to a substantially constant moderate regeneration temperature comprised between the temperature of air entering the adsorbent and a temperature that is higher by at most about 50° C. than the entering air temperature, and means for sending to the refrigeration tower gas exiting from the chamber in regeneration phase.

9. An installation according to claim 8, further including heating water circuit means for transferring heat from the compressed air to the residual gas before said residual gas is supplied to the chamber in regeneration phase, said heating water circuit means comprising a second heat exchanger positioned in said conduit means, a third heat exchanger positioned between the outlet of the air compressor and said first heat exchanger, and a transfer fluid circuit between said second and third heat exchangers.

10. An installation according to claim 8, further including heating water circuit means for transferring heat from the compressed air to the residual gas before said residual gas is supplied to the chamber in regeneration phase, said heating water circuit means comprising a second heat exchanger positioned in said conduit means and placing the residual gas in heat exchange relation with the compressed air leaving the air compressor.

11. An installation according to claim 8, further including a supercharger for supercharging at least a portion of the purified air exiting a chamber in adsorption phase, and means for placing the supercharged air in heat exchange relation with the residual gas before said residual gas is supplied to the chamber in regeneration phase.

* * * * *